Oct. 12, 1971     M. M. HOWLETT ET AL     3,611,800

MACHINE FOR PROCESSING OR TESTING GEARS

Filed April 27, 1970     7 Sheets-Sheet 3

MASON M. HOWLETT
PHILIP F. WHITE
INVENTORS

BY *Morton A. Polster*

United States Patent Office 3,611,800
Patented Oct. 12, 1971

3,611,800
MACHINE FOR PROCESSING OR TESTING GEARS
Mason M. Howlett and Philip F. White, Rochester, N.Y.,
assignors to The Gleason Works, Rochester, N.Y.
Filed Apr. 27, 1970, Ser. No. 32,007
Int. Cl. G01m 13/02
U.S. Cl. 73—162
23 Claims

ABSTRACT OF THE DISCLOSURE

A universal gear-testing machine for testing a pair of gears mounted on two spindles carried by the machine. The weight of one spindle assembly being carried by a vertically displaceable support column, and the weight of the other spindle assembly being carried by the machine frame. The support column includes an adjustment means for effecting vertical adjustments, and the weight supported by the column is relieved from the adjustment means by a fluid pressure counterbalance system so that adjustment can be precisely and easily effected. One of the spindles of the machine is driven by a driving means which permits a full range of movements of machine elements without requiring an adjustment of the driving means itself. The other spindle of the machine is provided with an automatic braking means which can apply and maintain a preset braking force on the spindle while the spindle is being rotated. One spindle is also provided with a backlash measuring device which measures angular displacement between a pair of meshed gears when one of the gears is prevented from rotating in its axis. The machine includes hydraulically controlled clamping devices for its slideways and other moving elements, and a hydraulic system is provided for simultaneously controlling clamping and providing lubrication to the slideways and other surfaces.

BACKGROUND AND BRIEF DESCRIPTION OF INVENTION

This invention relates to machines for processing or testing gears and other workpieces which can be meshed together into a running engagement. Such machines are capable of performing operations of testing, lapping, honing, burnishing, or similar functions, on a variety of gear types. Typically, two gears of a pair are mounted on separate spindles and adjusted to mesh with one another in preferred running relationships. The gears of the pair may both be work gears, or one of them may be a work gear and the other a master gear or a gear shaped tool.

The type of machine contemplated by this invention is generally shown and described in U.S. Pat. 1,909,088, dated May 16, 1933. Such a machine is referred to as a universal gear testing machine because it can test a variety of gear types under running conditions. The tests can be carried out either under load or without load, and the gear types that can be tested include right angle and angular bevel and hypoid gears, spur and helical gers, worm gears and worm wheels, internal gears, and others. Such machines can test for characteristics of tooth bearing, quality of rolling contact between a pair of gears, and degree of backlash between a pair of meshed gears. Other patents relating to this general subject matter include U.S. Pats. 2,582,408; 2,961,873; and 3,176,512. In addition, the subject matter of allowed application Ser. No. 671,769, filed Sept. 29, 1967 is of interest to this type of testing machine.

The processing or testing machine of this invention is provided with a drive spindle and a brake spindle for carrying a pair of gears in running engagement, as is known in this art. The functions of the drive and brake spindles, and the drive and brake heads with which they are associated, are understood to those skilled in this art of gear testing machines, and the disclosures of the above mentioned patents are included herein by reference to explain such known structures and functions. In accordance with the present invention, a gear testing or processing machine is provided with certain improvements which allow it to carry out operations with greater precision on a wider variety of gear types, sizes, weights, and configurations.

In prior art machines of this type which must perform precision testing operations and comparisons, a major problem is often noted when testing heavy gears, namely, load variables on the machine upset adjustments intended to place a pair of gears in precise relationships to one another. That is, the weight of the heavier gears and the heavier arbors required to hold them often distort frame and adjustment members to prevent accurate readings from frame-referenced positioning scales, and this added weight also contributes to further distortions when the machine is subjected to operating moments, resulting in an undesirable loss of accuracy.

In order to substantially reduce or eliminate some of the distortion problems encountered with prior art machine structures, the present invention provides for a novel support column arrangement which receives and carries the weight of one gear piece and its associated spindle and head. This weight, as well as the weight of the supporting column itself, is directed downwardly directly onto a base or floor surface upon which the machine is installed, and this load is essentially isolated from the main frame of the machine. Thus, the frame of the machine carries only moment forces and the remaining load resulting from the other gear piece and its associated spindle and housing structures. This means that the machine frame carries much less of a load than in prior arrangements, and the likelihood of "sag" or distortion of the frame is greatly reduced. Therefore, the machine frame, which is used as a reference for positioning the spindles, is less likely to be in error than with prior arrangements.

Vertical position of the spindle carried by the support column is adjusted by the vertical movement of the support column itself. A fluid pressure counterbalance relieves the vertical adjusting means of the weight of the entire support column, including the spindle assembly as well as the mounted gear, so that the machine members comprising this adjustment means do not suffer distortion from this weight and vertical adjustment movements can be effected more easily and more precisely than would be the case if the adjustment means were subjected to the load of the column. Further, the fluid pressure counterbalance acts similar to a servomechanism, since its constant unit pressure will continue to accurately maintain the position of the support column even in the event that the floor or base surface supporting the column may sink under static, or operating loads. Also, the novel column structure disclosed herein permits the spindle assembly supported thereby to be designed with less overhang, resulting in less static moments, i.e., in a better balanced machine.

In addition to an improvement in weight distribution for such a machine, the invention also provides for an improved driving means for transmitting driving moments from a motor to a drive spindle associated with the support column means. The improved driving means operates through a set of endless belts which are related to one another in such a way that the drive head of the machine and the support column means are fully adjustable through a wide range of adjustments without requiring a changing of driving belts or a readjustment of belt tensions.

The invention also provides for an automatic braking system for applying a known braking force to one of the spindles, of the machine. The braking system includes a pressure operated braking device controlled by a control circuit which can maintain a preset braking force on one spindle of the machine.

The machine is also provided with a backlash readout device which measures angular displacement between a pair of gears when one of the gears is prevented from rotating while the other is manually rocked back and forth. With the backlash readout device of the present invention, it is possible to measure backlash without necessitating movement of the gear spindle axes from their carefully-established spaced positions for proper running engagement.

Finally, the invention provides for a hydraulic system which not only controls a part of the operation of certain clamping or locking devices but which additionally provides for an automatic lubrication of slideways and other surfaces.

These and other features and advantages of the present invention will become apparent in the more detailed discussion which follows, and in that discussion reference will be made to the accompanying drawings as briefly described below.

DETAILED DESCRIPTION OF INVENTION

Figure 1:
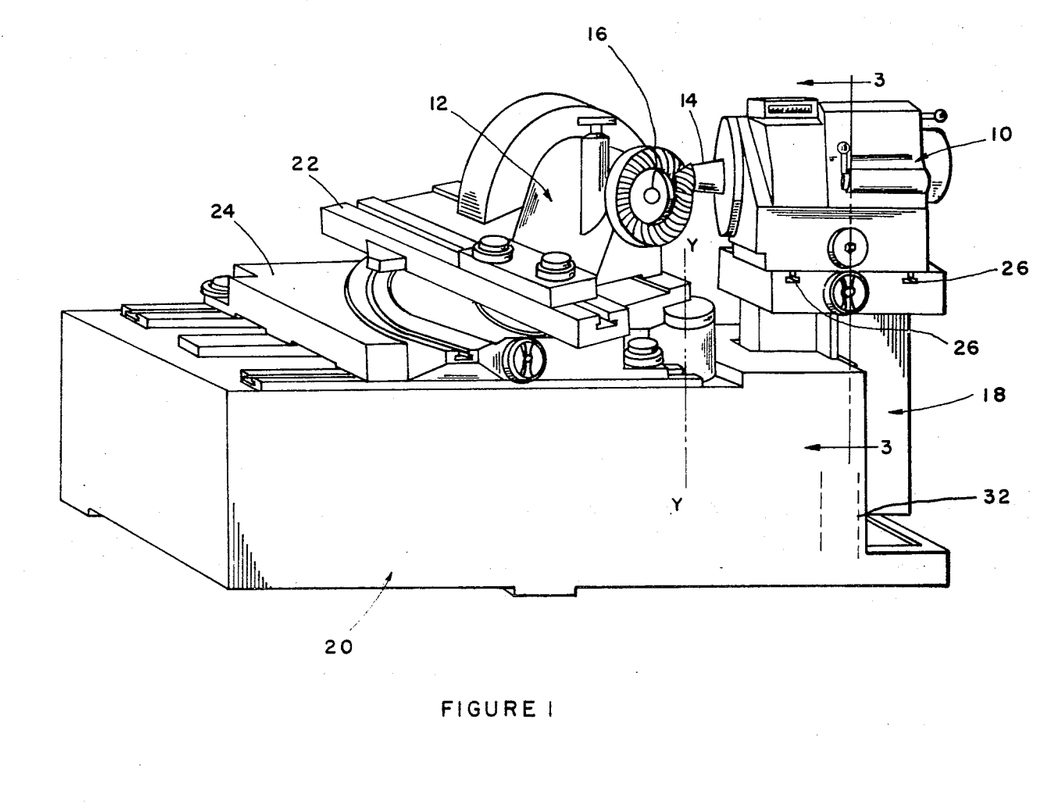
FIG. 1 is a perspective view of a testing machine, somewhat simplified for purposes of clarity, of the type contemplated by the present invention.
Figure 2:
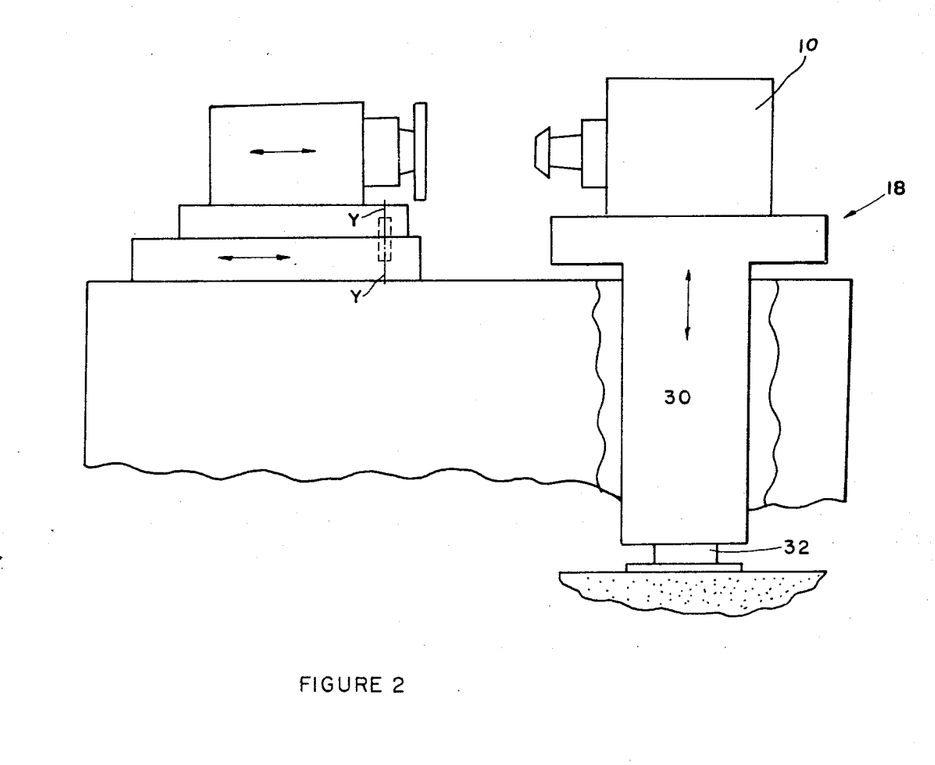
FIG. 2 is a schematic elevational view of a portion of the machine shown in FIG. 1, illustrating loading relationships of certain components of the machine.

Referring to FIGS. 1 and 2, the basic working components of a gear testing machine are illustrated. This type of machine is generally the same as that described in U.S. Pat. 1,909,088, and reference can be made to that patent for a more detailed understanding of constructional features for such a machine.

Basically, the illustrated machine includes two heads which can be adjusted relative to one another to position one gear in a preferred running relationship to another gear. Although the workpieces may be reversed from what is shown in FIGS. 1 and 2, the illustrated arrangement provides for a drive (or pinion) head 10 and a brake (or gear) head 12. The drive head 10 carries and supports a drive spindle means 14, and the brake head 12 carries and supports a brake spindle means indicated at 16. Gear pieces can be removably mounted on the respective spindle in accordance with known techniques. The illustrated machine also includes a support column means 18 for supporting essentially all of the weight of the drive head 10, its associated drive spindle 14, and any gear piece which may be secured to the drive spindle. In addition, the machine includes a frame 20 which functions to support working components associated with the brake head 12, its spindle 16, and any gear piece attached to the brake spindle 16. Thus, it can be seen that the weight of the machine is divided into two separate portions carried respectively by the support column means 18 and the frame means 20.

The illustrated machine also includes conventional adjustment features known to machines of this type, and such adjustment features include a swinging base 22 for the brake head means (which swings about the center line y—y) and a sliding base 24 (which moves in a horizontal plane from left to right in the FIG. 1 view). Furthermore, the brake head 12 can be adjusted in a separate horizontal plane which is generally along the axis of its brake spindle 16. Thus, the brake head 12 and a gear piece carried by its brake spindle can be very precisely oriented to adjust the position of the axis of rotation of the gear piece.

In addition to the adjustments just discussed, the drive head portion of the machine can be adjusted relative to the brake head portion. The drive head 10 can be vertically adjusted by a vertical adjustment of the support column means 18 in a manner which will be discussed in greater detail later. In addition, the drive head 10 can be adjusted relative to the support column means 18 in a horizontal plane in directions generally perpendicular to the plane of the FIG. 2 view. As illustrated, slideways 26 are provided for guiding the horizontal adjustment of the drive head 10 relative to the support column means 18. This adjustment is effected by manually turning an adjustment screw means in accordance with known structures and techniques for effecting adjustment of one machine component relative to another. Details of such adjustment means are shown and described in Bauer Pat. 1,909,088, and reference is made to the disclosure of that patent for a fuller understanding of what is within the skill of this art at the present time. In fact, the various relative adjustments which have been just discussed are all shown in the type of machine illustrated in the Bauer Pat. 1,909,088 with the exception that the present invention provides for vertical adjustment of the drive head spindle by means of a support column while horizontal adjustment is achieved by the drive head itself, rather than by the reverse arrangement which is shown in the Bauer patent. These differences in adjustment for the drive spindle are a result of improvements provided in supporting structures associated with the drive head portion of the machine, as will be more readily understood from the FIG. 3 discussions below.

Figure 3:
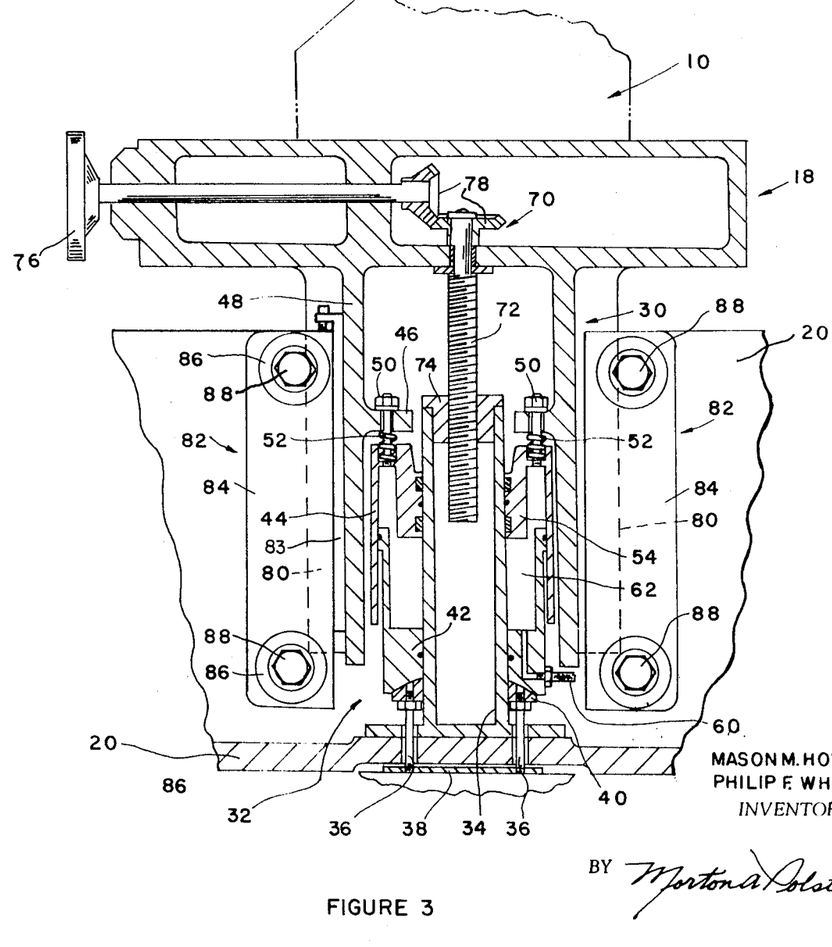
FIG. 3 is an enlarged elevational view, partly in cross section, as seen generally along lines 3—3 of FIG. 1 to illustrate details of a support column means of the machine.
Figure 4:
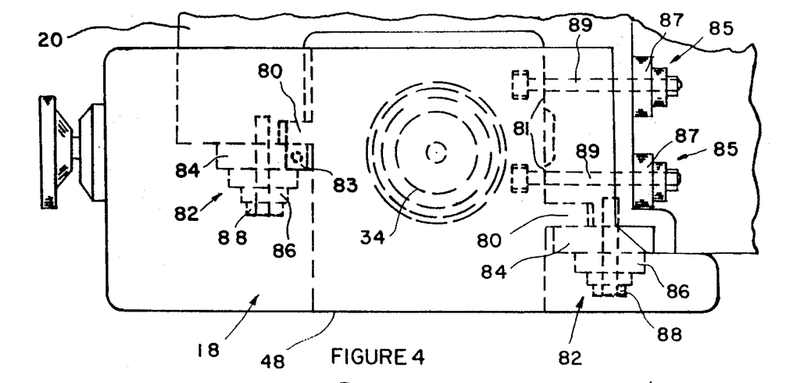
FIG. 4 is a top plan view of the end of the machine which is illustrated in FIG. 3.

FIGS. 2 through 4 illustrate improvements of the present invention which provide for a novel division of load in a machine of this type so that the relative positions of an individual spindle axis can be more precisely determined and established. As pointed out in the preliminary part of this specification, machines of this type have suffered from actual distortions caused by heavy gears and the heavier arbors required to hold such gears, and these distortions have often made it quite difficult for an operator to precisely position one spindle axis relative to another in situations where extreme precision is required to carry out a testing operation.

As shown in FIG. 2, the present invention provides for a division of load between the machine frame and the support column. Essentially, the weight supported by column means 18 is isolated from the frame iself so that loading of the frame is substantially reduced. However, in order to provide for such a distribution of load, a novel support column means has been invented to permit vertical adjustment of the drive head portion of the machine, while, at the same time, providing for the transfer of the weight of this drive head portion directly to the floor, or a base, through the support column itself.

Referring to FIGS. 3 and 4, the support column means 18 is illustrated in greater detail. A first section 30 at the upper end of the support column means 18 is vertically adjustable relative to the frame 20 of the machine, and a second section 32 at the lower end of the support column means rests in contact with the floor or a base surface upon which the machine is installed. As shown, the second section 32 is received within the first section 30, and the first section 30 can telescope relative to the second section 32. The second section 32 is assembled around a cylindrical inner section 34 which carries substantially no load at all from the support column means. In the discussion and claims which follow, the support column means 18 will be described as being assembled from two basic sections 30 and 32, with the section 30 being axially movable relative to the section 32. The cylindrical inner section 34 rests on a bottom plate of the frame 20, but the load bearing section 32 transmits its load through the bottom plate of the frame by way of support rods 36 so that there is no load on the frame itself from the support column means and its associated structures. For purposes of asesmbly, the second section 32 is made up of a floor plate element 38, a member of support rods 36 interconnecting the floor plate 38 with an annular ring 40 (which is movable relative to the inner section 34 and not secured thereto), and an annular piston element 42 which rests upon the annular ring 40. The piston element 42 is generally cup-shaped and of a generally cylindrical configuration. It can be seen that downward load forces on the piston element 42 are transmitted to the annular ring 40 and then through the rods 36 to the floor plate 38. The upper surface of the annular ring 40 is shaped with a taper, as shown, so that a small amount of axial misalignment in the support column 18 or small irregularities in the flatness of the floor or base, will be accommodated in an installation of the machine.

The movable portion 30 of the support column means 18 is also assembled from several components for ease of manufacture and assembly. An annular piston element 44 is attached to an inner flange 46 which is integral with a larger housing section 48 of the movable support column section 30. The piston element 44 is generally shaped like an inverted cup and is cylindrical in configuration to mate with the piston element 42 discussed above. Attachment is effected with a plurality of bolt fasteners 50 which include springs 52 fitted between the flange 46 and an upper surface of the piston element 44 to prevent actual contact between the piston and the flange. The piston element 44 is constructed and shaped to mate with the lower piston element 42 in a telescoping relationship so that the two piston sections can move relative to each other. In addition, the piston element 44 includes an annular portion 54 which mates with the outside surface of the cylindrical inner section 34 of the assembly. Sealing gaskets are provided between mating surfaces (between the annular piston section 54 and the outside surface of the cylindrical section 34 between the slidable surfaces of element 42 and cylindrical section 34, and between the upwardly extending piston element 42 and the downwardly piston 44) so that a fluid seal can be maintained between the assembled components.

When the support column is assembled as shown in FIG. 3, air, or other fluid, is introduced by way of an inlet conduit 60 into an annular chamber 62 formed between the piston elements 42 and 44. Pressurized air is supplied from any suitable source, and controls may be provided for admitting the air through the inlet conduit 60. In a typical installation, air is admitted and maintained at about 60 p.s.i.g., and this is a sufficient pressure to carry the load of the upper support column section 30 on the lower support column section 32. It can be appreciated that the weight of the upper support column, including its drive head and drive spindle and other associated structures, is transmitted downwardly into the pressurized air contained in the annular chamber 62, and from there downwardly onto the lower column section 32 which rests upon the floor or base where the machine is installed. Thus, the air support system just described may be considered a counterbalancing means for counterbalancing the weight of the upper column section 30.

With the system which has been just described, it is possible to relieve essentially all load of the support column means 18 from an adjustment screw means 70 which functions to provide vertical adjustment of the column relative to the machine frame 20. The adjustment screw means 70 comprises a threaded shaft 72 which is received into a threaded nut 74 of the fixed inner section 34. Rotation of the threaded shaft 72 raises and lowers the adjustment screw means and its associated upper support column section relative to the inner section 34. Rotation of the adjustment screw means 70 is effected manually by turning an adjustment wheel 76 through a pair of gears 78. The threaded shaft 72 and its associated gear are mounted so that they can be rotated relative to the support column 30 without moving axially relative to the column. Thus, a very precise vertical adjustment of the upper column section 30 can be effected very easily and without a need for actually lifting the entire load of the upper column section and its associated structures. It should also be noted that since the pressure in chamber 62 is maintained at a constant value, the counterbalancing means functions as a servomechanism to maintain the vertical position of upper column section 30 and the drive spindle axis relative to frame 20 even though sinking or distortion may occur in the floor-supported lower section 32 of the column support assembly.

FIGS. 3 and 4 also illustrate a clamping arrangement for securing the entire support column means 18 relative to the frame 20 of the machine. The upper housing 48 of the support column is generally rectangular in its outside profile and includes flanges 80 extending outwardly and vertically for substantially its entire length. The flanges 80 may be formed integrally with the casting which forms the housing structure 48, or they may be secured to the housing. The flanges 80 are received in guide channels formed in the frame 20 of the machine, being slidably constrained in said channels by gibs 84. Further support for column 30 is provided by vertical ways 81 on frame 20 in cooperation with tapered gib 83. Clamping means 82 and 85 are provided for securing the support column into fixed positions relative to the machine frame once a vertical adjustment of the column has been carried out. These clamping means are shown in simplified schematic form and include well-known hydraulically releasable spring means (not shown) contained within clamp elements 86 and 87, the latter being secured to frame 20 by suitable screws 88 or T-bolts 89. Thus, when a vertical positioning of the upper column section 30 has been accomplished, it can be clamped in that position into tight engagement with frame 20. It can be seen that the air supporting system of support column means 18 not only relieves load on the adjustment screw means 70 but also prevents a transmission of weight into the frame of the machine by way of the clamping means. Since the upper column section 30 is essentially counterbalanced by the pressurized air contained in the air chamber 62, there is no real weight transmitted from the upper column to the frame 20 at points of attachment of the column to the frame.

Figure 5:
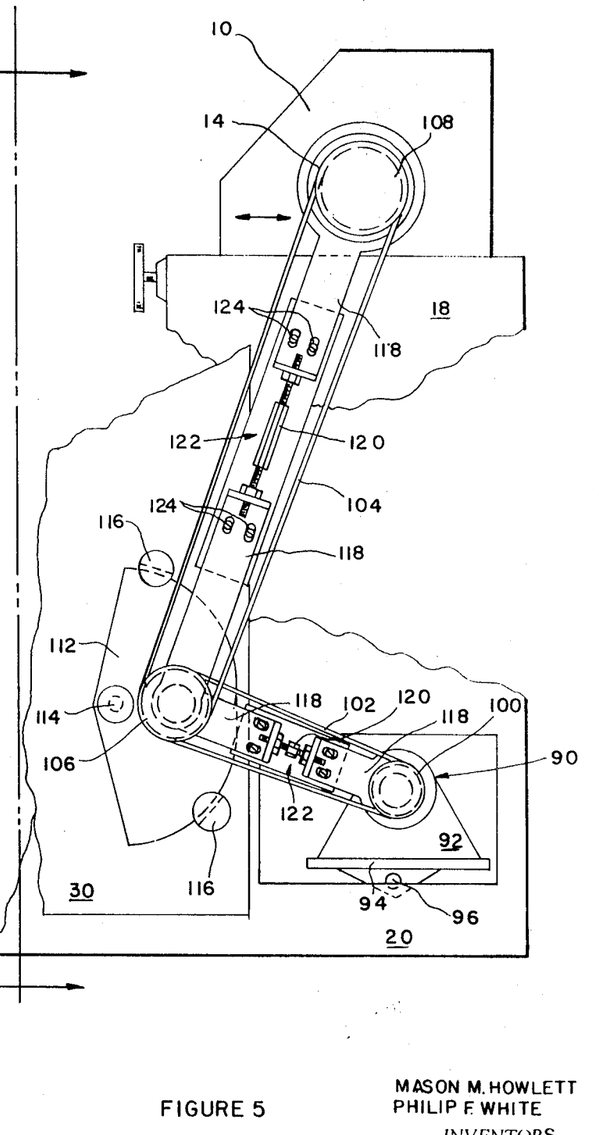
FIG. 5 is an enlarged elevational view, with sections broken away, of a part of the machine which includes a novel driving means for driving the drive spindle of a drive head.
Figure 6:
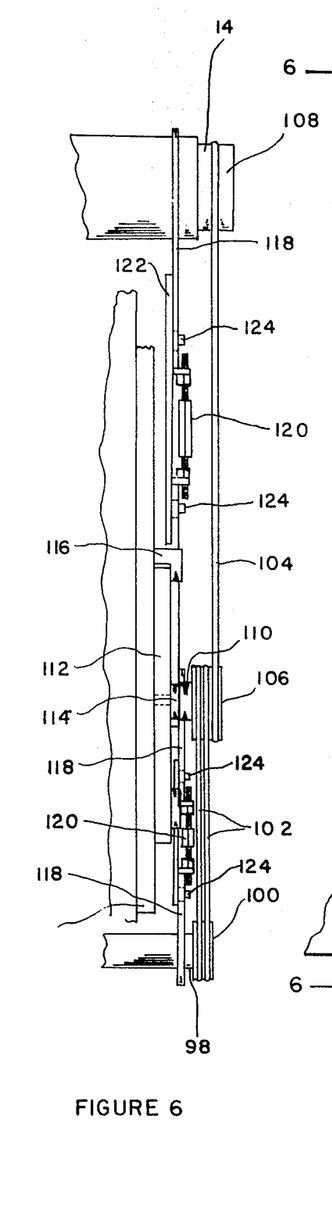
FIG. 6 is an end elevational view as seen on line 6—6 of FIG. 5, although the driving system shown in FIG. 6 is adjusted to a longer overall length than that shown in FIG. 5.

FIGS. 5 and 6 illustrate a novel drive train arrangement for the driving means which drives the spindle of the drive head 10. It is known in machines of this type to provide for a mounting of a drive motor means in a portion of the machine frame and to provide for a transmission of driving forces from the drive motor means to a drive spindle associated with an adjustable head. However, since the drive head is adjustable through a range of vertical and horizontal positions, it has been necessary to provide for separate adjustment means for the drive motor itself and for its associated drive train whenever adjustment of the drive spindle is effected. The arrangement shown in FIGS. 5 and 6 eliminates prior art requirements for separate adjustment of the drive motor or its associated drive train elements when the drive head 10 is adjusted through a range of positions.

Referring to FIG. 5, a known driving motor 90, which may be an electrical type, is mounted by brackets 92 to a base plate 94 pivotally secured to a portion of the frame 20 of the machine. The mounting plate for the motor is pivoted at 96 in accordance with known techniques. An output shaft 98 (see FIG. 6) of the motor 90 carries a drive pulley 100 of known construction. The drive pulley 100 is ultimately connected to the drive spindle means 14 of the machine by way of endless belts 102 and 104. Two endless belts 102 interconnects the drive pulley 100 with an intermediate pulley 106; and the endless belt 104 interconnects the intermediate pulley 106 with a driven pulley 108 associated with the drive spindle 14. The intermediate pulley 106 is mounted on a rotatable shaft 110 secured to a bracket means 112 which is in the form of a sector plate pivotally mounted at 114 to a movable portion 30 of the support column means 18. Since the intermediate pulley 106 is mounted to the movable part 30 of the support column means 18, it can be appreciated that vertical adjustments of the upper section of the column will cause a relative movement of the position of the intermediate pulley 106 in accordance with a re-positioning of the bracket 112 about its pivotal axis 114. Clamping devices 116 are provided for securing the bracket means 112 once an adjustment of the spindle head has been completed.

Each of the endless belts 102 and 104 is provided with tensioning means comprising a pair of plate elements 118 which can be adjusted in spaced positions relative to each other by turn buckle adjustment means 120. Each plate element 118 embraces a portion of a spindle or spindle housing associated with a pulley, and the pair of plate elements 118 are mounted on a backing plate 122 so that they can be secured into position once an adjustment has been made with the turn buckle 120. The plates 118 are secured relative to the backing plate 122 by bolt fasteners 124.

With the arrangement shown in FIGS. 5 and 6, it is possible to adjust tension for each of the endless belts 102 and 104 and to then drive the drive spindle 14 for all required machine operations without further adjustment, other than that required from a stretching of the belts themselves. In addition, the spindle head 10 can be moved vertically and horizontally through an entire range of positions without a requirement for re-adjusting the position of the drive motor 90 or any of its associated drive train elements.

Figure 7:
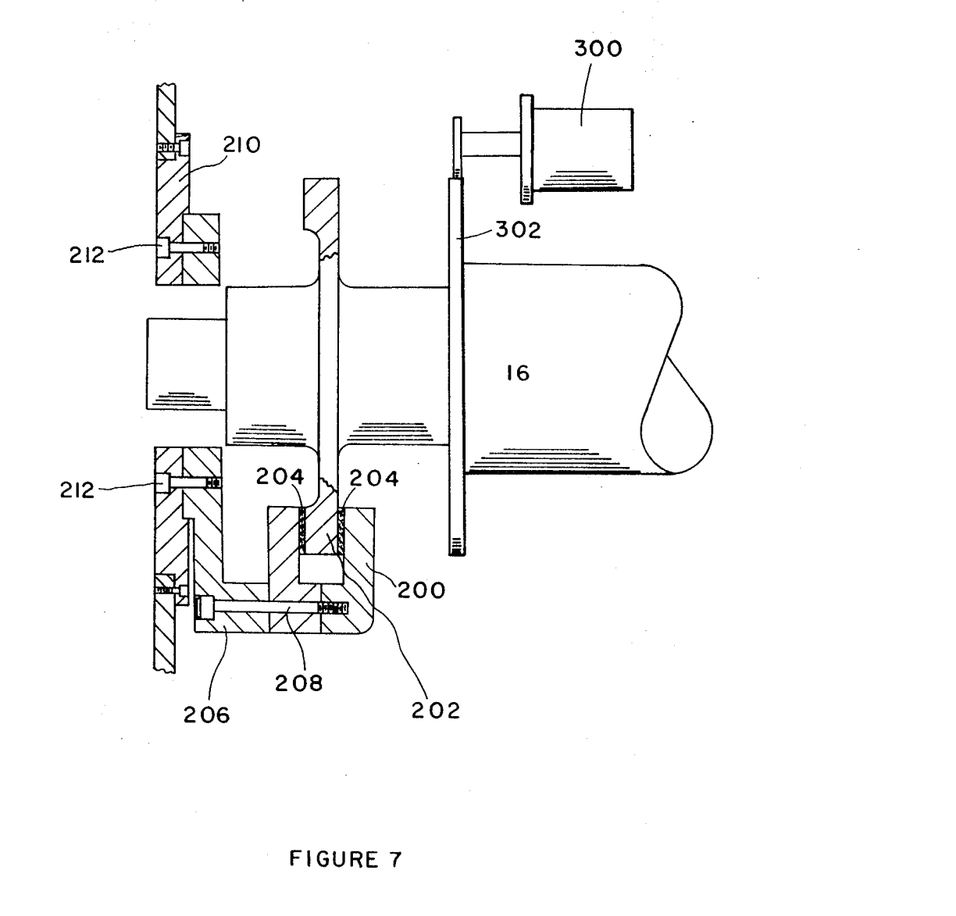
FIG. 7 is a greatly enlarged view, partly in cross section, of a braking means associated with the brake spindle of the machine of this invention.

FIG. 7 illustrates a braking means 200 which is operatively connected to a portion of the brake spindle 16 of the brake head portion of the machine. It is known in machines of this type to apply a braking force to a brake spindle by a hand braking arrangement such as shown in the above mentioned Bauer patent. Other prior art braking systems utilize eddy current brakes, and even separate drive motors on two spindles of a machine with one motor driven at a different rate to give a braking effect. Also, various current-measuring and torque-sensing devices are used to determine and control the braking loads applied to the driven spindle of a gear testing machine. However, these prior art arrangements for applying and controlling braking loads have sometimes been inconsistent, are usually dependent upon operator interpretation, and often lack a desired degree of precision. In accordance with the arrangement shown in FIG. 7, a novel braking means 200 can be automatically controlled to apply and maintain a precisely consistent, preset braking force on the brake spindle 16 of a gear testing machine of the type contemplated herein.

The braking means 200 comprises a known disc or caliper braking device which can be actuated with fluid (preferably air) pressure. The braking means comprises a pair of opposed elements which can be moved into frictional engagement with a disc or flange 202 formed on or carried by the brake spindle 16. Brake pads 204 are carried by the opposed elements in a manner known to this art. Means for actuating the opposed elements towards and away from the flange 202 include suitable piping for receiving compressed air from a source (not shown) and piston elements which are operatively connected to the opposed elements to move the same when pressure is applied to certain surfaces of the piston elements. The braking means 200 is secured to a brake bracket 206 by suitable bolt fasteners 208. The brake bracket 206 is in the form of a ring-shaped member which, in turn, is secured to an annular torque sensor means 210 by bolt fasteners 212. The torque sensor means is merely a ring which is secured to the brake bracket 206 in such a way that it receives torque moments from the brake bracket when the braking means is actuated to apply a braking force on the rotating flange 202. The torque sensor ring is connected to strain gauges (not shown) of known construction for providing a torque readout for the braking system.

Figures 8, 9:
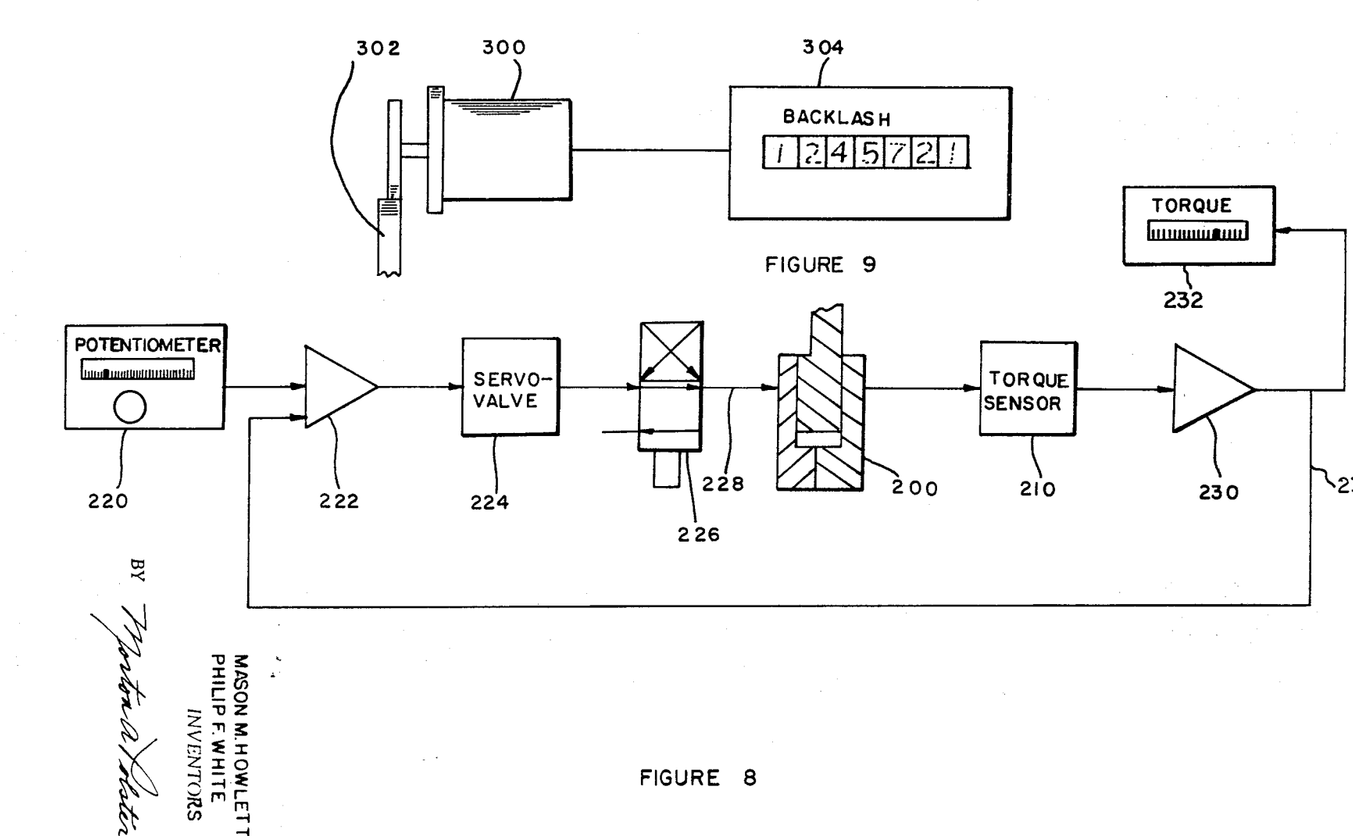
FIG. 8 is a diagrammatic view of a control circuit associated with the braking means shown in FIG. 7.
FIG. 9 is a diagrammatic view of a backlash testing means combined with the machine of this invention.

The braking means which is described above with reference to FIG. 7 may be included in an automatic control circuit of the type shown in FIG. 8. The automatic control circuit includes a potentiometer control 220 for setting a desired level of braking force to be applied to the brake spindle of the machine. A signal from the potentiometer control 220 is transmitted through a servo amplifier 222 and to a modulating servo valve means 224 which controls the pressure of air flow to a solenoid valve 226 The solenoid valve 226 functions merely to control the on-off operation of a braking means 200 and this is done by permitting or preventing the passage of regulated air pressure flow through a conduit 228 to the braking means 200. A torque sensor means 210 is mechanically operated by torque moments from the braking means 200 (as discussed with reference to FIG. 7) to generate a torque readout signal through an amplifier 230. A torque readout may be provided at 232. The torque readout signal is returned to the servo amplifier 222 for a comparison with the original preset signal level from the potentiometer 220. If there is a difference in signal from the readout circuit 234, as compared with the signal received from the control potentiometer 220, the servo amplifier 222 will adjust the control signal going to the servo valve 224 so as to adjust the amount of braking force applied by the braking means 200. In this manner, there is a continuous comparison and adjustment of brake force applied to a rotating brake spindle during a testing operation.

FIGS. 7 and 9 illustrate the use of an angular encoder 300 in combination with the brake spindle 16 to provide a reading for a backlash test that can be performed by a machine of this type. Backlash is measured only when the brake spindle 16 is not rotating and when the drive spindle of the machine is locked from rotation. With the drive spindle locked, and with a pair of gears in running engagement with each other, the brake spindle gear can be manually rocked back and forth for limited angular distances to measure backlash between mating gear teeth. Rocking movements of the brake spindle 16 are transmitted through a friction disc 302, rigidly secured to the brake spindle, and then to the angular encoder 300 by means of a second friction disc secured to a shaft of the encoder. The angular encoder 300 measures angular displacement in radians and provides a signal readout at 304. With this arrangement it is possible to measure backlash without adjusting the running position set for a pair of gears, and the backlash test can be performed in a sequence with other tests carried out by the same machine.

Figure 10:
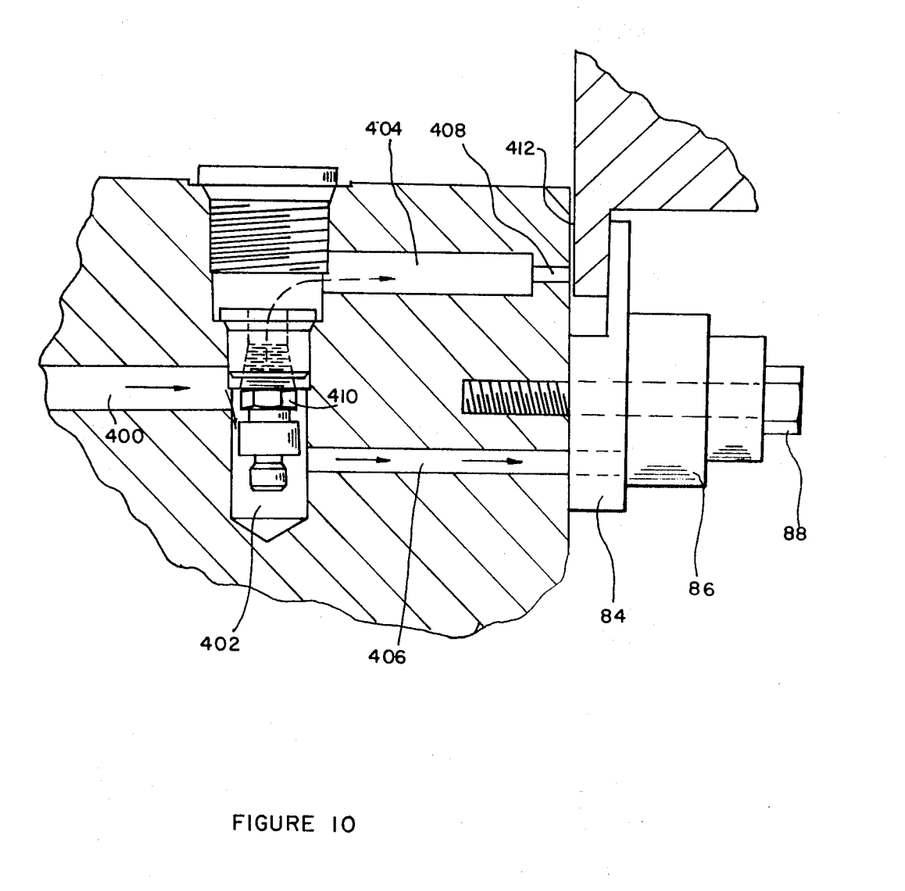
FIG. 10 is a greatly enlarged view, taken in a horizontal plane, of a system for controlling certain clamping operations and lubrications for the machine of this invention.

FIG. 10 illustrates a hydraulic system associated with the machine of this invention for (a) effecting certain unclamping movements of clamping devices 84 and other clamping devices associated with the machine, and for simultaneously (b) effecting a lubrication of slideways of the machine, all from a single source of hydraulic fluid. This arrangement may be utilized at a number of places on the machine where slideways are provided for relative movement between major components and where clamping devices are associated with those components to fix their positions once adjustment has been carried out. As shown in FIG. 10, a main conduit 400 receives hydraulic fluid from a source of supply (not shown), and the pressurized fluid is fed into a chamber 402. From there the fluid can follow two separate circuits 404 and 406. The 404 circuit includes a reservoir chamber having an outlet 408 which carriers hydraulic fluid from a metering valve means 410 to lubricate surfaces of a slideway 412. The circuit 406 includes a conduit communicating with a clamping means 84 in such a way that hydraulic pressure applied to the clamping means will move a gib out of engagement with a flange or other structure which it is holding. The metering valve means 410 is of a known construction and includes a piston means within a chamber for metering a known quantity of hydraulic fluid into the circuit 404 each time pressure is applied to the main conduit 400. The piston is carried within a chamber, and the chamber is filled by leakage of fluid past the piston when no lubricating or unclamping actions are taking place. Then, when the line pressure is raised, the piston is urged against a spring into its chamber to expel the stored quantity of hydraulic fluid out of the chamber and into the circuit 404 for supplying lubricant to a slideway. When the line pressure is decreased, the piston moves back to its starting position by the action of a spring, and additional hydraulic fluid leaks past the piston and into the chamber in which it is mounted. Line pressure is controlled by known valving devices.

Although the invention has been described with reference to a specific embodiment of a testing machine, it will be appreciated that the principles of the invention can be applied to similar gear processing and testing equipment. Such applications of the principles of this invention are intended to be included in the scope of the claims which follow.

What is claimed is:

1. In a machine for processing gears, the combination comprising:
   a frame means for supporting a portion of the load of the machine,
   a support column means for carrying a remaining portion of the load of the machine, said support column means having a first section which is vertically adjustable relative to said frame means and a second section which remains in contact with a floor or base upon which said machine is mounted,
   an adjustment means for effecting vertical adjustment of said first section of the support column means, and
   a counterbalancing means for relieving loading on said adjustment means so that adjustment can be effected easily and precisely.

2. The combination of claim 1 wherein said first and second sections of said support column means include elements which telescope relative to one another in such a way that a fluid pressure chamber is defined between the telescoping elements.

3. The combination of claim 2 wherein said counterbalancing means includes a system for introducing a fluid into said fluid pressure chamber.

4. The combination of claim 1 wherein said adjustment means comprises a screw means having a threaded shaft extending between said first and second sections of said support column means so as to effect axial movement of the first section relative to the second section when the threaded shaft is rotated.

5. The combination of claim 1 wherein said machine is a gear testing machine having a first spindle head means carried by said support column means and a second spindle head means carried by said frame means.

6. The combination of claim 5 wherein said first spindle head means comprises a drive head which functions to support a pinion on a drive spindle carried by the first spindle head means, and including adjustment means for moving said drive head in a horizontal plane relative to said support column means.

7. The combination of claim 6 wherein said second spindle head means comprises a brake head which functions to support a gear which is to be positioned in running engagement with the pinion carried by said first spindle head means, said gear being carried by a brake spindle carried by said brake head.

8. The combination of claim 6 and including a driving means for driving said drive spindle, said driving means comprising:
   a motor means carried by said frame means, said motor means having an output shaft which carries a drive pulley,
   a driven pulley operatively connected to said drive spindle of said drive head,
   an intermediate pulley associated with said support column means and movable with vertical movements of the support column means,
   endless belt means interconnecting said drive pulley with said intermediate pulley and said intermediate pulley with said driven pulley so as to transmit driving moments from said motor means to said driven pulley, and
   tensioning means for adjusting and maintaining tensions on said endless belt means.

9. The combination of claim 8 wherein said motor means is pivotally mounted relative to said frame means and wherein said intermediate pulley is movable relative to said support column means so that driving moments can be transmitted to the drive spindle for all adjusted relative positions of the drive head and the support column means without requiring a readjustment of tension on the endless belt means.

10. The combination of claim 9 wherein said intermediate pulley is mounted on a bracket means which is pivotally secured to said support column means.

11. The combination of claim 7, and including adjustment means for moving said brake head horizontally relative to said frame means.

12. The combination of claim 11, wherein said brake spindle of said brake head is operatively connected to a braking means which functions to apply a known braking force on said brake spindle.

13. The combination of claim 12 wherein said braking means is included in a control circuit which provides for a torque readout and comparison of actual braking force applied to the brake spindle as compared to a torque input signal set to control the braking means.

14. The combination of claim 13 wherein said braking means is operated by fluid pressure, and wherein direction and rate of fluid pressure flow are controlled by valving means included in said control circuit.

15. The combination of claim 14 wherein torque input signals to said braking device comprise electrical signals set by a variable potentiometer means.

16. The combination of claim 12 wherein said braking means comprises a caliper brake device operating on an annular flange or disc carried by said brake spindle.

17. The combination of claim 11 wherein said brake spindle of said brake head is operatively engageable with an angular encoder means which functions to measure angular displacement of the brake spindle to provide a backlash readout for gears being tested by said machine.

18. The combination of claim 1 wherein said machine further comprises slideways and clamping devices for facilitating said adjustment, and a hydraulic system for (a) effecting unclamping movements of the clamping devices and for (b) effecting a lubrication of said slideways from a single source of hydraulic fluid.

19. The combination of claim 18 wherein said hydraulic system includes separate circuits for control of clamping devices and for lubrication of slideway surfaces, and further including metering valve means for dictating fluid flow into the separate circuits.

20. In a gear testing machine of the type which carries a drive spindle and a brake spindle, each of which is adjustable in its position relative to the other, for supporting a pair of gear means in running engagement for testing purposes, the improvements comprising a vertically displaceable support column means for supporting the load of one of said spindles while a frame means supports the load of the other spindle, said support column means being in load bearing contact with a floor or base surface upon which said machine is installed, a driving means for driving the drive spindle, and a braking means for applying a braking force to said brake spindle, said braking means having a braking device which is operated by fluid pressure and controlled by an automatic control circuit which provides for continuing comparison and adjustment of a preset fluid pressure signal as compared to an actual braking force applied to the brake spindle.

21. The improvements of claim 20 wherein said brake spindle is further provided with a backlash readout device for measuring angular displacement between a pair of meshed gear means when one of the gear means is prevented from rotating in its axis of rotation.

22. The improvements of claim 20 wherein said drive spindle is carried by a drive head means supported on said vertically displaceable support column, and including driving means for driving said drive spindle, said driving means having:

a motor means carried by said frame means, said motor means having an output shaft which carries a drive pulley, a driven pulley operatively connected to said drive spindle of said drive head, an intermediate pulley associated with said support column means and movable with vertical movements of the support column means, endless belt means interconnecting said drive pulley with said intermediate pulley and said intermediate pulley with said driven pulley so as to transmit driving moments from said motor means to said driven pulley, and tensioning means for adjusting and maintaining tensions on said endless belt means.

23. In a processing or testing machine of the type in which a workpiece is mounted for being driven on a spindle and which requires that controlled braking force be applied to the spindle, the improvement comprising:

a braking means for automatically maintaining a preset braking force function on said spindle while the spindle is being rotated, said braking means including a fluid pressure operated braking device controlled by an automatic control circuit having (a) means for applying an input signal to the braking device in accordance with a preset value, (b) means for comparing actual braking force applied to the spindle with the preset value, and (c) means for automatically adjusting the input signal if a difference is detected by said means for comparing.

References Cited
UNITED STATES PATENTS

| | | | |
|---|---|---|---|
| 1,732,730 | 10/1929 | Porter et al. | 73—162 |
| 1,909,088 | 5/1933 | Bauer | 73—162 |

S. CLEMENT SWISHER, Primary Examiner